United States Patent [19]

Kamiya

[11] Patent Number: 5,400,082
[45] Date of Patent: Mar. 21, 1995

[54] DEVICE FOR REDUCING NOISE IN A COMPOSITE VIDEO SIGNAL

[75] Inventor: Shingo Kamiya, Hamamatsu, Japan
[73] Assignee: Yamaha Corporation, Japan
[21] Appl. No.: 992,817
[22] Filed: Dec. 16, 1992
[30] Foreign Application Priority Data
Dec. 18, 1991 [JP] Japan .................................. 3-353731
[51] Int. Cl.[6] ......................... H04N 5/21; H04N 5/213
[52] U.S. Cl. .................................... 348/619; 348/620
[58] Field of Search ............... 358/167, 166, 162, 160, 358/37, 36, 39, 40, 31; H04N 5/213, 5/21, 9/64; 348/607, 618, 619, 620, 621, 622, 623, 625, 627, 628, 629, 630, 631

[56] References Cited
U.S. PATENT DOCUMENTS 4,791,487 12/1988 Kozuki et al. ...................... 358/166
5,051,818  9/1991 Mishima ................................ 358/31

FOREIGN PATENT DOCUMENTS 0085971  4/1991  Japan ........................... H04N 5/21

Primary Examiner—James J. Groody
Assistant Examiner—Michael H. Lee
Attorney, Agent, or Firm—Graham & James

[57] ABSTRACT

A device for reducing noise includes a first delay circuit for producing a first delay signal which is spacewise continuous to a current signal, a second delay circuit for producing a second delay signal which is timewise continuous to the current signal, first and second signal coincidence judging circuits for comparing the current signal with the first and second delay signals at a sampling period and judging whether or not difference in level between the current signal and the first and second delay signals is below a predetermined value continuously for a predetermined number of samples, and a conditional averaging circuit for providing, when it has been judged by the first or second signal coincidence judging circuit that the condition that difference in level between the current signal and the first or second delay signals is below the predetermined value continuously for the predetermined number of samples has been satisfied, an output signal which is an average value of one or both of the delay signals satisfying said condition and the current signal and providing, when there is no delay signal satisfying said condition, the current signal as an output signal thereof. Video S/N and color S/N of signals reproduced from video disc player etc. can be improved in the stage of a composite video signal.

15 Claims, 3 Drawing Sheets

DEVICE FOR REDUCING NOISE IN A COMPOSITE VIDEO SIGNAL

BACKGROUND OF THE INVENTION

This invention relates to a device for reducing noise in a composite video signal of a video reproducing device such as a video disc player and a video tape player, capable of improving video S/N (luminance signal S/N) and color S/N at the stage of a composite video signal.

In case of improving the video S/N and the color S/N of video disc players and video tape players, conventional devices as composite video signal processing use a noise reduction circuit utilizing a several sample delay (i.e., correlation in the horizontal direction) such as one shown in FIG. 5. In this circuit, input composite video signals of the NTSC system, for example, are digitalized in an A/D converter 1 by sampling at a frequency 4 fsc, which is four times as high as a color subcarrier frequency fsc. This digital signal (current signal) and a delay signal, which was delayed at a period of frequency 4 D fsc which is 4 D times as high as a color subcarrier frequency fsc, where D is an integer, in a delay circuit 2 in consideration of phase relation of the color subcarrier frequency, are added in an adder 3, and then the result of addition is divided into ½ in a divider 4 to average them.

This noise reduction circuit aims at reducing noise having no horizontal correlation by the averaging processing in consideration of horizontal correlation of video signals. In the circuits of this type, an edge having no horizontal correlation such as a vertical edge becomes inaccurate, so that improvements are made such as detecting vertical edges and avoiding the averaging processing in the detected vertical edges.

In the above mentioned noise reduction circuit, the noise reduction effect is high in a high frequency region but it is low in a low frequency region. This is obvious from the phenomenon that a reproduced outputs of such equipments as a laser disc player and a video tape recorder actually exhibits horizontal stripes made from red, orange, red . . . as shown in FIG. 6, not withstanding that the original signal exhibits a plain red color. The phenomenon that the irregular shading is more prominent in the vertical direction than in the horizontal direction indicates that a PM (phase modulation) noise of a chrominance signal is generated comparatively more frequently in the low frequency region.

In the circuit in FIG. 5, however, noise in the low frequency region can not be improved sufficiently and, therefore, the S/N of a chrominance signal cannot be improved effectively.

It is, therefore, an object of the invention to eliminate the above mentioned disadvantage and improve effectively video S/N (luminanee signal S/N) as well as color S/N of video disc players and video tape playback devices at the stage of a composite video signals.

SUMMARY OF THE INVENTION

For achieving the above described object of the invention, the device for reducing noise in a composite video signal according to the invention comprises first delay means for producing a first delay signal which is spacewise continuous to a current signal, second delay means for producing a second delay signal which is timewise continuous to the current signal, first correlation detection means for detecting a correlation between the current signal and the first delay signal, second correlation detection means for detecting a correlation between the current signal and the second delay signal, conditional averaging means for providing, when a correlation is detected by at least one of first and second correlation detection means, an output signal which is an average value of a corresponding delay signal and the current signal and, when no correlation is detected, the current signal as an output signal thereof.

When a past signal (first delay signal), which is spacewise continuous to the current signal, or a past signal (second delay signal), which is timewise continuous to the current signal is nearly coincidental to the current signal, both video S/N and color S/N can be improved especially in the condition of the composite signal by utilizing an average of the past signal and the current signal.

In the above case, when there is no past signal which is nearly coincidental to the current signal, it is better not to take the average of them. In this case, therefore, the current signal only is selected when there is no past signal which is nearly coincidental to the current signal.

As the past signal which is spacewise continuous and the past signal which is timewise continuous, not only the first and second delay signals but also third or more delay signals may be employed. In this case, processing in means is the conditional averaging diversified.

According to the invention, there is also provided a device for reducing noise in a composite video signal comprising input means for receiving an analog composite video signal and for converting the analog composite video signal into a digital signal at a predetermined sampling frequency, delay means for causing the input digital signal to delay for a predetermined period wherein a delay signal is spacewise continuous to a current signal immediately provided by said input means, correlation detection means for detecting a correlation between the current signal and the delay signal, and conditional averaging means for providing, when a correlation is detected by said correlation detection means, an output signal which is an average value of the delay signal and the current signal and, when no correlation is detected, the current signal as an output signal thereof.

A preferred embodiment of the invention will be described below with reference to the accompanying drawings.

BRIEF DESCRIPTION OF THE DRAWINGS

In the accompanying drawings.

DESCRIPTION OF A PREFERRED EMBODIMENT

Figure 1:
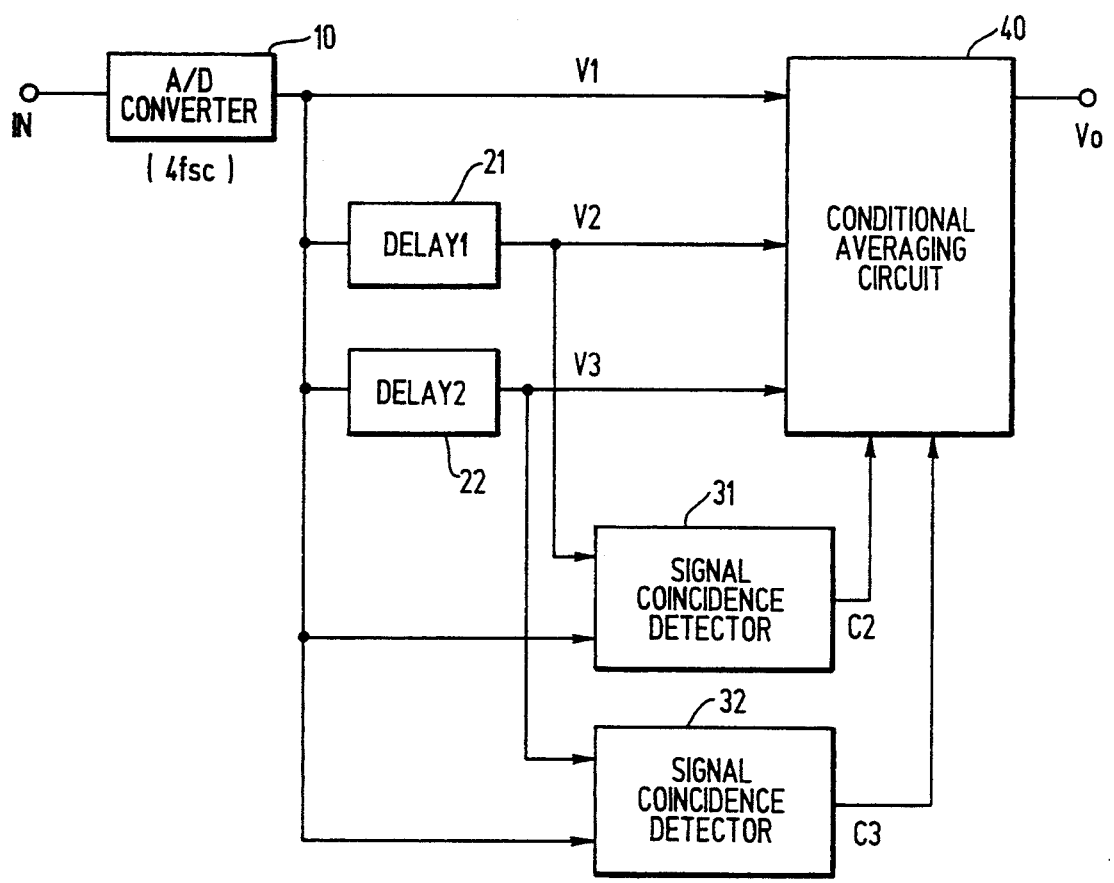
FIG. 1 is a block diagram showing an embodiment of this invention.

FIG. 1 is a block diagram showing an embodiment of this invention. In this embodiment, a video disc player is assumed and a NTSC composite video signal obtained by FM-demodulating a reproduced output of the video disc player is applied to an input IN. As is well known, since a composite signal in a video disc player is directly FM-demodulated and recorded without being separated into Y signal (luminance signal) and C signal (chrominance signal), it is not necessary to separate it into Y and C in the system.

Figure 5:
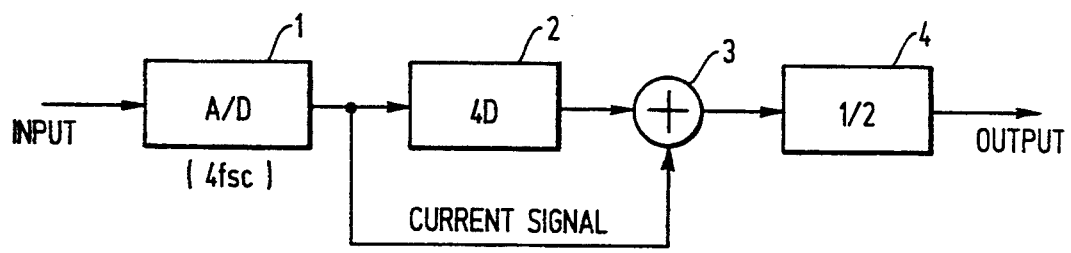
FIG. 5 is a block diagram showing a prior art noise reduction circuit.
Figure 6:
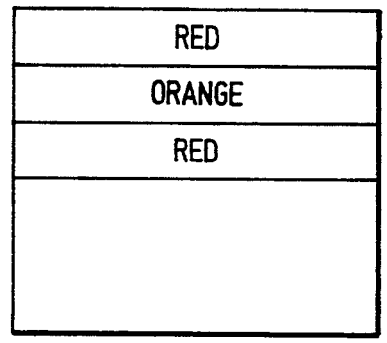
FIG. 6 is a diagram showing influence of noise in the low frequency region.

The above mentioned input composite signal is converted by an A/D converter 10 to a digital signal for digital processing. Sampling frequency of the A/D converter 10 is 4 fsc, same as in the device of FIG. 5.

At the posterior stage of the A/D converter 10 are connected first and second delay circuits 21 and 22 which produce first and second delay signals V2 and V3 which are delayed signals of a current signal V1.

In the first delay circuit 21 which detects a past signal spacewise continuous to the current signal, the amount of delay is set at 1 H+2 samples approximately 1 line before. The reason for not setting the amount of delay at 1 H which is exactly 1 line before is that, in the case of sampling of 4 fsc, the phase is inverted between the current signal and a signal of 1 line before. For this reason, data of 1 H+2 samples is used as a signal which is approximately 1 line before and is matched in phase with the current signal. Accordingly, any data may be employed for the delay so long as these conditions are satisfied.

In the second delay circuit 22 which detects a past signal timewise continuous to the present signal, the amount of delay is set at 2 frames in consideration of the phase.

Although these delay circuit 21 and 22 may be independently designed, they can be provided in one chip by using a part of a RAM.

Figure 7A:
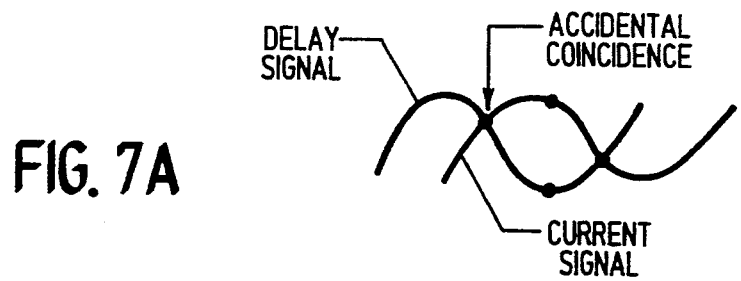
FIG. 7(A), 7(B) are waveform diagrams showing signal correlation.
Figure 7B:
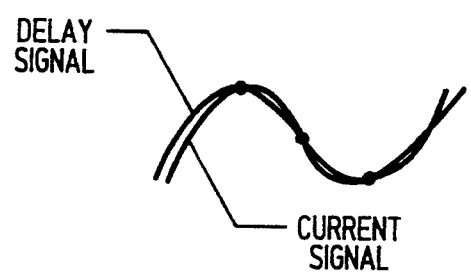

The current signal V1 and the first delay signal V2 are compared with each other in a first signal coincidence detector 31. In the same way, the current signal V1 and the second delay signal V3 are compared with each other in a second signal coincidence detector 32. Each signal coincidence detector judges correlation between lines or frames by using results obtained by detecting several continuous samples. This arrangement is made because, if result of detection obtained from only one sample point was used, it would cause an erroneous detection by judging a signal coincidence at a sample point where signals which have no correlation with each other have coincided as shown in FIG. 7A. By utilizing results of detection of several continuous series of samples, only correlated signals can be detected as shown in FIG. 7B.

A conditional averaging unit 40 produces an output V0, which has been obtained by conditionally averaging the current signal V1, the first delay signal V2 and the second delay signal V3, in accordance with outputs C2 and C3 of the signal coincidence detectors 31 and 32. The principle of this averaging condition is that, when there is a delay signal or delay signals, which have correlationship with the current signal, the average of the delay signal or signals and the current signal is adopted, whereas, when there is no delay signal which has correlation with the current signal, only the current signal is provided as an output.

Figure 2:
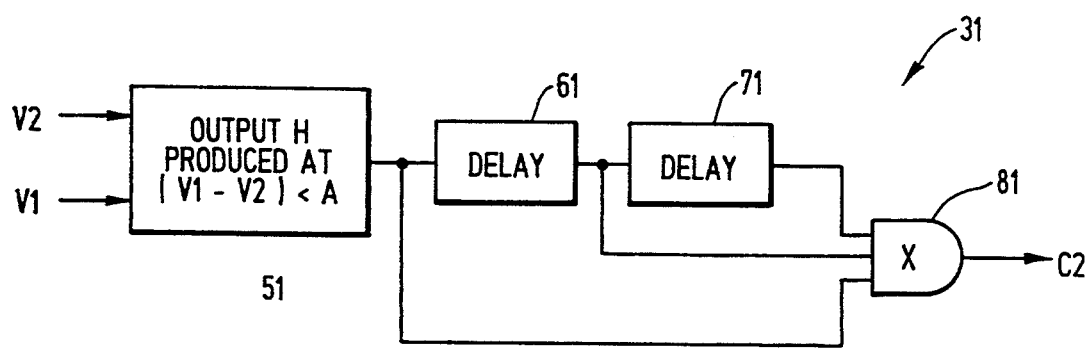
FIG. 2 is a diagram showing a specific example of a first signal coincidence detector.

FIG. 2 is a specific example of the first signal coincidence detector 31. A level difference detector 51 detects correlation between the two inputs V1 and V2. Level difference at every sampling point is detected by this level difference detector 51, which, if the difference (absolute value) is less than a predetermined value A which is a permissible level, produces an output which is at H (high) level. When the output of this level difference detector 51 is delayed by one sample at a delay unit 61, then delayed again at a delay unit 71 by one sample, an output C2 of an AND gate 81, which receives three outputs of the level difference detector 51, the delay unit 61 and the delay unit 71, becomes H level only in case that the current signal V1 and the delay signal V2 coincide at three sample points, and otherwise the output of the AND gate 81 is at L (low) level.

Figures 3, 4:
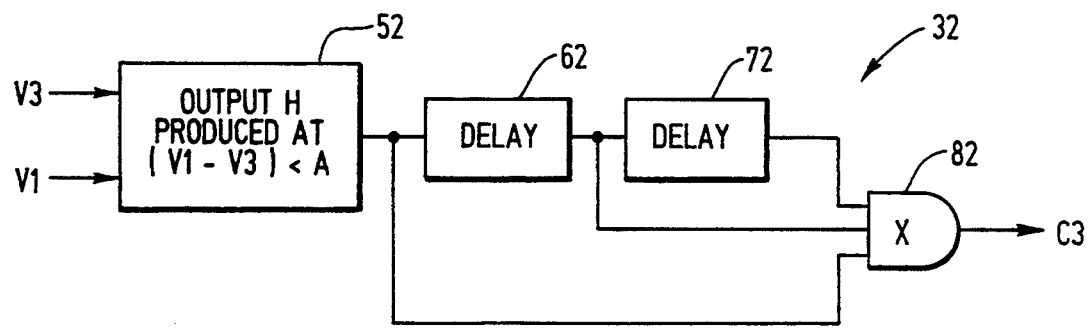
FIG. 3 is a diagram showing a specific example of a second signal coincidence detector.
FIG. 4 is a diagram showing a specific example of a conditional averaging circuit.

FIG. 3 is a specific example of a signal coincidence detector 32. This detector 32 is constructed in the same manner as the detector 31 of FIG. 2. A level difference detector 52 judges if a difference in level between the current signal V1 and the delay signal V3 is less than a predetermined value A. Reference characters 62 and 72 designate one sample delay units and 82 an AND gate for judging correlation of 3 samples. Accordingly, an output of this gate 82 becomes H level in case that the inputs V1 and V3 coincide continuously for 3 continuous sample points, and L level otherwise.

FIG. 4 shows an averaging condition of a conditional averaging circuit 40. Each of 4 kinds of combination of H and L levels of the outputs C2 and C3 of the signal coincidence detectors 31 and 32 shows correlation of past signals to the current signal. For example, since C2=C3=H indicates that the delay signals V2 and V3 are correlated to the current signal V1, in this case, an output V0 is produced by adopting additional average of the three signals V1, V2 and V3. In case C2=H, C3=L, since the first delay signal V2 only has correlation, the output V0 is produced by adopting additional average of V1 and V2 only. Likewise, in case C2=L, C3=H, as the second delay signal V3 only has correlation, the output V0 is produced by adopting additional average of V1 and V3 only. In case C2=C3=L, neither the first delay signal V2 nor the second delay signal V3 has correlation, the current signal V1 only is adopted as the output V0.

By conducting such conditional averaging processing as described above, video S/N and color S/N can be improved in the state of a composite video signal. For example, it is verified experimentally that, when a delay signal which has been delayed one line is used as a past signal, the PM S/N and the video S/N are improved by approximately 3 dB.

In the above described embodiment, signals which are respectively about one line before and 2 frames before were used as the spacewise and timewise related signals. However, a signal of any part may be employed if it can reduce noise in the low frequency region to sufficient extent and coincides in phase of the color sub-carrier wave. The number of signals used for averaging processing are not limited to two but may be more than two. Further, the number of results of detection used in the signal coincidence detectors need not always be three but may be any number if it is two or more.

What is claimed is:

1. A device for reducing noise in a composite video signal comprising:

first delay means for producing a first delay signal which is spacewise continuous to a current signal;

second delay means for producing a second delay signal which is timewise continuous to the current signal;

first correlation detection means for detecting a correlation between the current signal and the first delay signal;

second correlation detection means for detecting a correlation between the current signal and the second delay signal;

conditional averaging means for providing, when a correlation is detected by at least one of said first and second correlation detection means, an output signal which replaces said current signal with an average value of a corresponding delay signal and the current signal and, when no correlation is detected, the current signal as an output signal thereof.

2. A device as defined in claim 1 wherein the first delay signal is a signal which is substantially plural scanning lines before the current signal.

3. A device as defined in claim 1 wherein the second delay signal is substantially plural scanning lines before the current signal.

4. A device for reducing noise in a composite video signal comprising:

first delay means for producing a first delay signal which is spacewise continuous to a current signal;

second delay means for producing a second delay signal which is timewise continuous to the current signal;

first correlation detection means for detecting a correlation between the current signal and the first delay signal;

second correlation detection means for detecting a correlation between the current signal and the second delay signal;

conditional averaging means for providing, when a correlation is detected by at least one of said first and second correlation detection means, an output signal which replaces said current signal with an average value of a corresponding delay signal and the current signal and, when no correlation is detected, the current signal as an output signal thereof;

wherein said first correlation detection means comprises first signal coincidence judging means for comparing the current signal with the first delay signal and for judging whether or not different in level between the current signal and the first delay signal is below a predetermined value, said first correlation detection means detecting the correlation when it is judged by said first signal coincidence judging means that a condition that difference in level between the current signal and the first delay signal is below the predetermined value is satisfied; and said second correlation detection means comprises second signal coincidence judging means for comparing the current signal with the second delay signal and for judging whether or not difference in level between the current signal and the second delay signal is below a predetermined value, said second correlation detection means detecting the correlation when it is judged by said second signal coincidence judging means that a condition that difference in level between the current signal and the second delay signal is below the predetermined value is satisfied.

5. A device as defined in claim 4 further comprising input means coupled to said first and second correlation detection means and said condition averaging means, for receiving an analog composite video signal, for converting the analog composite video signal into digital signal at a predetermined sampling frequency and for respectively providing the digital signal for said first and second correlation detection means and said conditional averaging means.

6. A device as defined in claim 5 wherein said first and second signal coincidence judging means compare the current signal respectively with the first and second delay signals for a predetermined number of continuous samples which are obtained by sampling the analog composite video signal at the predetermined sampling frequency.

7. A method for reducing noise in a composite signal comprising the steps of:

producing a first delay signal which is spacewise continuous to a current signal;

producing a second delay signal which is timewise continuous to the current signal;

detecting a correlation between the current signal and the first delay signal;

detecting a correlation between the second current signal and the second delay signal; and providing, when a correlation is detected at least between the current signal and the first delay signal or between the current signal and the second delay signal, an output signal which replaces the current signal with an average value of a corresponding delay signal and the current signal and, when no correlation is detected, the current signal as an output signal thereof.

8. A device for reducing noise in a composite video signal comprising:

input means for receiving an analog composite video signal and for converting the analog composite video signal into a digital signal at a predetermined sampling frequency;

delay means for causing the input digital signal to delay for a predetermined period wherein a delay signal is spacewise continuous to a current signal immediately provided by said input means;

correlation detection means for detecting a correlation between the current signal and the delay signal; and conditional averaging means for providing, when a correlation is detected by said correlation detection means, an output signal which replaces the current signal with an average value of the delay signal and the current signal and, when no correlation is detected, the current signal as an output signal thereof.

9. A device as defined in claim 8 wherein the delay signal is a signal which is substantially plural scanning lines before the current signal.

10. A device for reducing noise in a composite video signal comprising:

input means for receiving an analog composite video signal and for converting the analog composite video signal into a digital signal at a predetermined sampling frequency;

delay means for causing the input digital signal to delay for a predetermined period wherein a delay signal is spacewise continuous to a current signal immediately provided by said input means;

correlation detection means for detecting a correlation between the current signal and the delay signal; and conditional averaging means for providing, when a correlation is detected by said correlation detection means, an output signal which replaces the current signal with an average value of the delay signal and the current signal and, when no correlation is detected, the current signal as an output signal thereof;

wherein the delay signal is a signal which is substantially plural scanning lines before the current signal, and wherein said correlation detection means comprises signal coincidence judging means for comparing the current signal with the delay signal and for judging whether or not difference in level between the current signal and the delay signal is below a predetermined value, said correlation detection means detecting the correlation when it is judged by said signal coincidence judging means that a condition that difference in level between the current signal and the delay signal is below the predetermined value is satisfied.

11. A device as defined in claim 10 wherein said digital coincidence judging means compares the current signal with delay signal for a predetermined number of continuous samples which are obtained by sampling the analog composite video signal at the predetermined sampling frequency.

12. A device for reducing noise in a composite video signal comprising:

input means for receiving an analog composite video signal and for converting the analog composite video signal into a digital signal at a predetermined sampling frequency;

delay means for causing the input digital signal to delay for a predetermined period wherein a delay signal is timewise continuous to a current signal immediately provided by said input means;

correlation detection means for detecting a correlation between the current signal and the delay signal; and conditional averaging means for providing, when a correlation is detected by said correlation detection means, an output signal which replaces the current signal with an average value of the delay signal and the current signal and, when no correlation is detected, the current signal as an output signal thereof.

13. A device as defined in claim 12 wherein the second delay signal is substantially plural scanning lines before current signal.

14. A device for reducing noise in a composite video signal comprising:

input means for receiving an analog composite video signal and for converting the analog composite video signal into a digital signal at a predetermined sampling frequency;

delay means for causing the input digital signal to delay for a predetermined period wherein a delay signal is timewise continuous to a current signal immediately provided by said input means;

correlation detection means for detecting a correlation between the current signal and the delay signal; and conditional averaging means for providing, when a correlation is detected by said correlation detection means, an output signal which replaces the current signal with an average value of the delay signal and the current signal and, when no correlation is detected, the current signal as an output signal thereof;

wherein the second delay signal is substantially plural scanning lines before current signal, and wherein said correlation detection means comprises signal coincidence judging means for comparing the current signal with the delay signal and for judging whether or not difference in level between the current signal and the delay signal is below a predetermined value, said correlation detection means detecting the correlation when it is judged by said signal coincidence judging means that a condition that difference in level between the current signal and the delay signal is below the predetermined value is satisfied.

15. A device as defined in claim 14 wherein said digital coincidence judging means compares the current signal with delay signal for a predetermined number of continuous samples which are obtained by sampling the analog composite video signal at the predetermined sampling frequency.

* * * * *